US007192351B2

(12) United States Patent
Rozkin et al.

(10) Patent No.: US 7,192,351 B2
(45) Date of Patent: Mar. 20, 2007

(54) MULTI-PLAYER GAMING MACHINES PLAYED ON-LINE

(75) Inventors: Sergiy Rozkin, Toronto (CA); Vladimir Dunaevsky, Toronto (CA)

(73) Assignee: Cryptologic, Inc., Ontario (CA)

( * ) Notice: Subject to any disclaimer, the term of this patent is extended or adjusted under 35 U.S.C. 154(b) by 366 days.

(21) Appl. No.: 10/640,214

(22) Filed: Aug. 12, 2003

(65) Prior Publication Data

US 2005/0037845 A1 Feb. 17, 2005

(51) Int. Cl.
*A63F 13/12* (2006.01)
*A63F 5/04* (2006.01)

(52) U.S. Cl. .......................................... 463/40; 463/20

(58) Field of Classification Search .................. 463/16, 463/20, 30, 31, 35, 40, 42
See application file for complete search history.

(56) References Cited

U.S. PATENT DOCUMENTS 5,397,133 A * 3/1995 Penzias ....................... 463/22
5,935,002 A * 8/1999 Falciglia ...................... 463/19
5,971,849 A * 10/1999 Falciglia ...................... 463/16
6,001,016 A * 12/1999 Walker et al. ................ 463/42
6,110,041 A 8/2000 Walker et al.
6,293,866 B1 9/2001 Walker et al.
6,361,437 B1 * 3/2002 Walker et al. ................ 463/23
6,527,638 B1 3/2003 Walker et al.
6,575,834 B1 * 6/2003 Lindo .......................... 463/40
6,582,310 B1 6/2003 Walker et al.
6,652,378 B2 * 11/2003 Cannon et al. ............... 463/20
6,860,810 B2 * 3/2005 Cannon et al. ............... 463/20

(Continued)

FOREIGN PATENT DOCUMENTS

WO WO 01/91866 A1 * 12/2001
WO WO 02/080052 A1 10/2002

OTHER PUBLICATIONS

Abdul Motalebel Saddik et al., "Peer-to-Peer Suitability for Collaborative Multiplayer Games," Proceedings Seventh IEEE International Symposium on Distributed Simulation and Real-Time Applications, Oct. 23-25, 2003, pp. 101-107.

(Continued)

*Primary Examiner*—Xuan M. Thai
*Assistant Examiner*—Matthew D. Hoel
(74) *Attorney, Agent, or Firm*—Patent Law Group LLP; Brian D. Ogonowsky

(57) ABSTRACT

A multi-player on-line gaming method is disclosed where different players independently play different games on their computers in a common gaming environment. Each of the players sharing the common environment is presented with a similar display by the game server. In one embodiment, each player is presented with a display of four slot machines after registering with a server for an on-line gaming session. Each player selects, using a cursor pointing device, one of the four slot machines to play, and that machine is then associated with the player. The remote web-based game server controlling the game allows the player to see other on-line players playing on the other slot machines displayed on the same screen so the players share a common gaming experience as in a casino. The players may chat in real time by typing in their conversations via a keyboard on their home computer.

15 Claims, 3 Drawing Sheets

U.S. PATENT DOCUMENTS

| | | | | |
|---|---|---|---|---|
| 6,999,083 | B2 * | 2/2006 | Wong et al. | 345/473 |
| 2002/0094869 | A1 * | 7/2002 | Harkham | 463/42 |

OTHER PUBLICATIONS

T. Cox, "Online and Multiplayer Gaming-An Overview," Virtual Reality, vol. 5, No. 4, 2000, pp. 215-222 (8 pages).

J. Dechau et al., "The Telebuddy®: Collective Tele-Presence and Tele-Conversation Through Physical Avatars," Computers & Graphics, vol. 25, No. 4, Aug. 4, 2001, pp. 601-608 (8 pages).

ICQ: Fun>Games>Multiplayer Games> + More Info. Retrieved on Nov. 22, 2004 from the Internet: <URL:http://www.icg.com/>, 2 pages.

International Search Report, 8 pages.

* cited by examiner

MULTI-PLAYER GAMING MACHINES PLAYED ON-LINE

FIELD OF THE INVENTION

This invention relates to on-line gaming and, in particular, to a video presentation to the player to increase the player's enjoyment while gambling on-line.

BACKGROUND OF THE INVENTION

On-line gaming has become very popular. A player typically plays in an isolated environment, such as a room in the player's home, and plays a video version of a casino gambling game. One popular gambling game played on-line is a slot machine. When playing such games, the player has no interaction with other players.

SUMMARY

A multi-player on-line gaming method is disclosed. In one embodiment, the player is presented with a display of four slot machines after registering with a game server for an on-line gaming session. The player selects, using a cursor pointing device, one or more of the four reel-type slot machines to play, and that machine(s) is then associated with the player. In one embodiment, the player's name is displayed on a portion of the selected slot machine.

The remote game server controlling the game allows the player to see other on-line players playing on the three other slot machines displayed on the same screen along with their names. Accordingly, the player sees outcomes of her plays on one of the slot machines while also seeing the other three players' outcomes on the other three slot machines.

The players may chat in real time by typing in their conversations via a keyboard on their home computer.

Other embodiments are envisioned, and any number of slot machines or other types of gaming devices that a player typically plays by herself are displayed in a multi-player format to achieve a more realistic casino experience. Typical machines displayed may include video poker machines, 3-reel machines, 5×3 video slot machines, and other types, even including those with progressive jackpots or bonus game screens.

DETAILED DESCRIPTION

Figure 1:
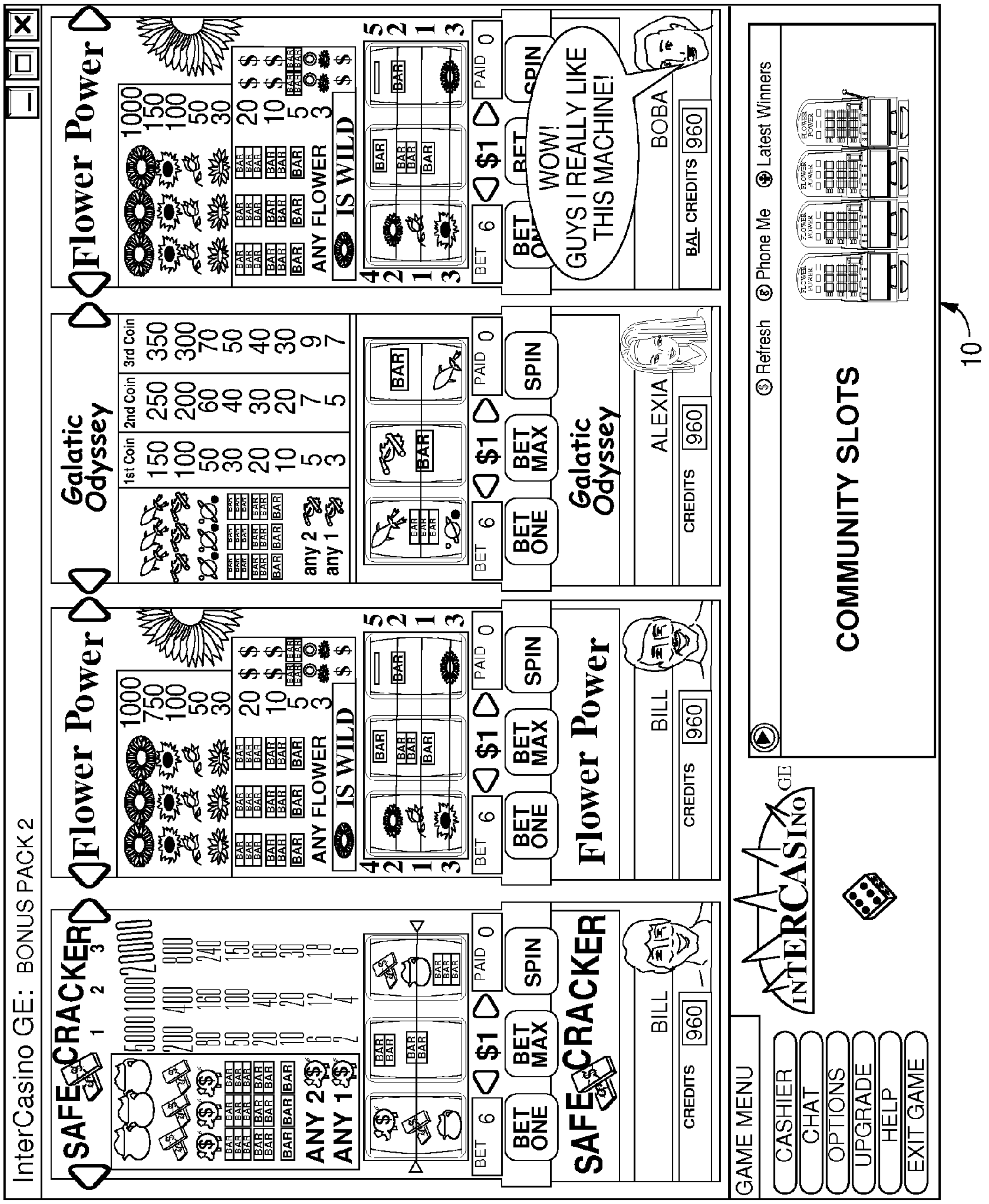
FIG. 1 is a sample screen viewed by an on-line game player showing slot machines being played by other on-line players.

FIG. 1 illustrates a display 10 on a video screen during an on-line gaming session being viewed by a player named Alexa in the example. The video screen will typically be the player's computer monitor. The player plays what traditionally has been a solitary slot machine alongside other players, Bob and Bill, playing other slot machines, with Bill playing two machines. All three players view, on their own computer screens, the on-going results of the other players' on-line gaming experience. This emulates a casino environment where the players socialize, and excitement is enhanced by the ambience of other people playing and winning.

Figure 2:
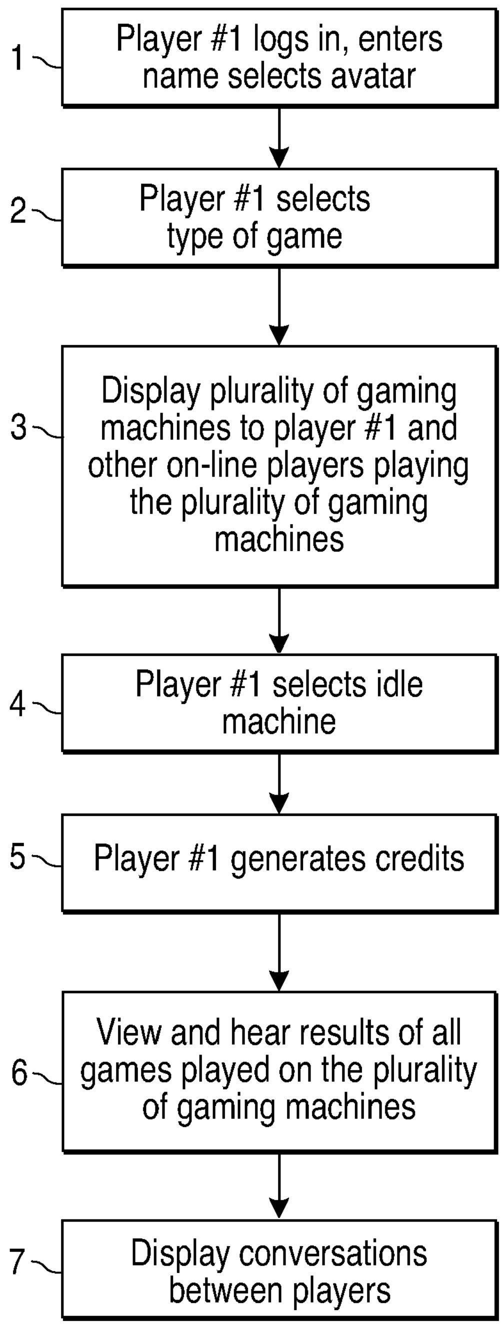
FIG. 2 is a flowchart illustrating certain steps conducted during an on-line gaming session.

FIG. 2 illustrates steps performed in one embodiment of the on-line gaming method.

In step 1, player #1 (Alexa) logs onto the Internet with a conventional web browser or stand-alone client gaming application and accesses the on-line gaming website using the provider's web address (URL). After a connection has been made, the player is presented with a log-on screen to allow the player to enter the player's identification and other information, such as the player's name, a PIN number, and a credit card number (for first time users). The player may also select an avatar, such as a head having features most similar to the player's features. The player then enters the virtual casino and is offered a menu to allow the player to select the game to play.

In step 2, the player selects the type of game to be played. In the case of FIG. 1, the player has selected "Community Slots," which displays four 3-reel slot machines (step 3), each one potentially being played by a different player. Other selections may include groups of specific types of slot machines, such as Wheel of Fortune™ slot machines, video poker slot machines, 5×3 video slot machines, or any other group of slot machines or other games. The presentation may take any form and is not limited to showing a video version of an entire slot machine. For example, only the video screen portion of a slot machine may be displayed. In FIG. 1, the slot machines displayed on the video screen appear as conventional mechanical reel type machines having reels rotated by a motor. The player may also select a traditional single slot machine display and not share the experience with other players.

In step 4, the player selects an idle one of the displayed four machines by clicking on the machine using a mouse-controlled cursor or other type of player control. In one embodiment, the player's name and avatar are displayed on the machine to give each on-line player a "personality."

In step 5, which may occur at any time, credits for play are generated by the player simply designating a monetary amount, such as $100, in a "cashier" menu by clicking on a $100 icon, and this amount is charged to the player's credit card number. In the embodiment shown in FIG. 1, the cashier menu is displayed by the player clicking on the cashier button. The player's credits are then displayed on a credit meter in the slot machine. The player also clicks on the cashier's button to cash out of the machine.

Other players who have previously logged on and have selected the same group of machines also have their credits, names, and avatars associated with their respective machines. In one embodiment, the web-based game server attempts to select for a new player an already active group of slot machines so the player can play alongside other players. A player can always choose to leave the group and join another group. If one player logs off, that same community group of machines may be selected by the web-based game server to be presented to the next player that logs in and selects the "Community Slots" game.

In step 6, all players play their respective machines by clicking on one of the bet buttons and then clicking on a spin button. The reels for each respective gaming machine then spin and randomly stop to display a combination of symbols. The pay table for each gaming machine is displayed on the "display glass" of the machine, and the appropriate award is then added to the player's credit meter for a winning outcome in accordance with the pay table. A losing game deducts from the credit meter. All players in the group view the same or a similar display, such as FIG. 1.

In one embodiment, the traditional sounds of a slot machine being played are transmitted to the player of that machine in a suitable audio format. Reduced volume sounds from the other machines played are also transmitted to the player such as would occur in an actual casino environment. Accordingly, the player sees and hears the results of the other machines to create a simulated casino environment.

In step 7, the player may click on a chat button and type in any dialog to, in effect, converse with the other players. All players see the dialog on the display 10 and may respond. Voice simulation may also be used which converts typed words into a simulated voice.

Accordingly, the players can have more fun by watching others' game experiences and engaging in conversation.

In one embodiment, the games played by the different players on the same screen are very different. For example, one player may be playing a video poker machine while another player is playing a reel-type slot machine.

Figure 3:
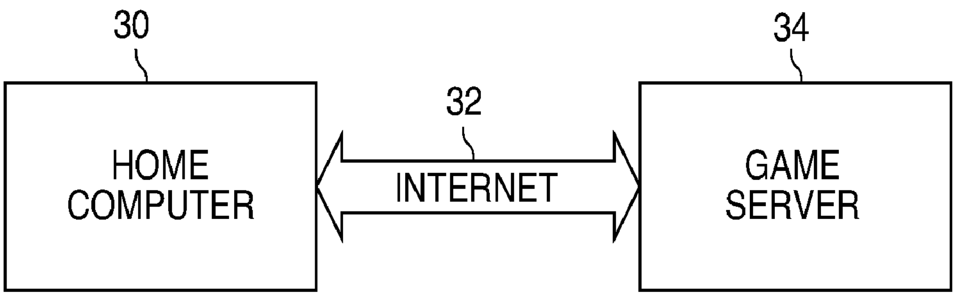
FIG. 3 illustrates a home computer and a game server connected via the Internet for on-line gaming.

The on-line gaming may be performed using a conventional home computer 30 (FIG. 3) logged onto the Internet 32 and accessing a game server 34. The home computer (or other computer or local terminal) contains a processor programmed to carry out the methods described herein. The game server may be conventional, and runs the novel gaming program described herein. The gaming program run by the player's home computer may be downloaded via the Internet from the provider's website or may be provided by a CD or other medium. During the game, the game server and player's computer communicate in a conventional manner. For example, the game server sends commands to the player's computer to display the random results of the games generated by the server. The player's computer then carries out a program to display the results on the slot machines. The Internet (or other communication medium used) provides digital instructions on a carrier wave for being processed by the processor in the home computer and in the game server.

Writing the software code for running on the game server and the local terminal for allowing multiple players to share a common gaming environment is well within the abilities of those skilled in the art.

The described on-line gaming may also be played via interactive TV, wireless mobile phones, and any other communications device having a display and player pointing device.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is claimed is:

1. A gaming method performed by a plurality of local terminals comprising:

establishing communication by a first local terminal with a remote server;

establishing communication by a second local terminal with the remote server;

transmitting signals by the first local terminal to the server for selecting a first type of game to be played by a first player at the first local terminal, the first type of game causing multiple gaming devices to be displayed on a first display screen connected to the first local terminal;

transmitting signals by the second local terminal to the server for selecting the first type of game to be played by a second player at the second local terminal, the first type of game causing the multiple gaming devices to be displayed on a second display screen connected to the second local terminal;

automatically assigning by the server the first player and the second player to a common playing environment;

displaying the multiple gaming devices on the first display screen;

displaying the multiple gaming devices on the second display screen;

enabling the first player to select at least a first gaming device out of the multiple gaming devices to play;

enabling the second player to select at least a second gaming device out of remaining multiple gaming devices to play;

displaying play of at least the first gaming device selected by the first player on the first display screen along with displaying play of at least the second gaming device selected by the second player on the first display screen;

displaying play of at least the first gaming device selected by the first player on the second display screen along with displaying play of at least the second gaming device selected by the second player on the second display screen, the display of the play of at least the first gaming device and the display of the play of at least the second gaming device being identical on the first display screen and the second display screen such that play of at least the first gaming device and at least the second gaming device appear to be occurring in a common playing environment; and displaying outcomes of games played on at least the first gaming device and on at least the second gaming device on the first display screen and the second display screen so that the first player and the second player share a common gaming experience, wherein displaying at least the first gaming device and at least the second gaming device comprises displaying images of slot machines having slot machine screens.

2. The method of claim 1 further comprising:

receiving commands by the first player for chatting with the second player; and displaying conversations between the first player and the second player.

3. The method of claim 1 further comprising generating sounds associated with operations of at least the first gaming device being played by the first player and at least the second gaming device being played by the second player.

4. The method of claim 1 wherein displaying at least the first gaming device and at least the second gaming device comprises displaying images of at least portions of reel-type slot machines.

5. The method of claim 1 wherein displaying at least the first gaming device and at least the second gaming device comprises displaying images of at least portions of video poker slot machines.

6. The method of claim 1 wherein displaying at least the first gaming device and at least the second gaming device comprises displaying images of at least portions of video slot machines.

7. The method of claim 1 wherein displaying at least the first gaming device and at least the second gaming device comprises displaying images of at least portions of slot machines, the method further comprises displaying one or more slot machines that are not in use by any player.

8. The method of claim 1 further comprising generating sounds relating to outcomes of the games played on at least the first gaming device and at least the second gaming device.

9. The method of claim 1 wherein displaying at least the first gaming device and at least the second gaming device comprises displaying up to four gaming devices.

10. The method of claim 1 wherein establishing communication with a remote server comprises establishing communication via the Internet.

11. The method of claim 1 further comprising displaying a menu to the first player offering the first player choices of games to play, the games comprising community games where the first player plays a game independently from one or more other players also playing independent games, where the first player's game and the one or more other players' games are displayed to the first player.

12. The method of claim 1 further comprising additional players at additional local terminals selecting and playing remaining gaming devices and viewing displays on display screens identical to displays on the first display screen and second display screen.

13. A computer usable medium containing a program code comprising instructions for carrying out a method comprising:

controlling a first computer to interact with a remote server;

controlling a second computer to interact with the remote server;

controlling the first computer to communicate with the server to select a game to be played by a first player, the game causing multiple gaming devices to be displayed on a first display screen connected to the first computer;

controlling the second computer to communicate with the server to select a game to be played by a second player, the game causing the multiple gaming devices to be displayed on a second display screen connected to the second computer;

controlling the first computer to display multiple gaming devices on the first display screen;

controlling the second computer to display the multiple gaming devices on the second display screen;

controlling the first computer to enable the first player to select at least a first gaming device out of the multiple gaming devices to play;

controlling the second computer to enable the second player to select at least a second gaming device out of the multiple gaming devices to play;

controlling the first computer to display play of at least the first gaming device selected by the first player on the first display screen along with displaying play of at least the second gaming device selected by a remote second player;

controlling the second computer to display play of at least the first gaming device selected by the first player on the second display screen along with displaying play of at least the second gaming device selected by the second player;

the display of the play of at least the first gaming device and the display of the play of at least the second gaming device being identical on the first display screen and on a second display screen such that play of at least the first gaming device and at least the second gaming device appear to be occurring in a common playing environment; and controlling the first computer and the second computer to display outcomes of games played on at least the first gaming device and on at least the second gaming device on the first display screen and the second display screen so that the first player and the second player share a common gaming experience, wherein the first gaming device and the second gaming device are displayed as images of slot machines having slot machine screens.

14. A computer for carrying out a gaming program, the computer comprising a processor programmed for carrying out the method comprising:

controlling the computer to interact with a remote server for running a gaming program;

controlling the computer to communicate with the server to select a game to be played by a first player, the game causing multiple gaming devices to be displayed on a first display screen connected to the computer;

controlling the computer to display multiple gaming devices on the first display screen;

controlling the computer to enable the first player to select at least a first gaming device out of the multiple gaming devices to play; and controlling the computer to display play of at least the first gaming device selected by the first player on the first display screen along with displaying play of at least a second gaming device selected by a remote second player;

the display of the play of at least the first gaming device and the display of the play of at least the second gaming device being identical on the first display screen and on a second display screen of a remote terminal played by the second player such that play of at least the first gaming device and at least the second gaming device appear to be occurring in a common playing environment so the first player and the second player share a common gaming experience, wherein the first gaming device and the second gaming device are displayed as images of slot machines having slot machine screens.

15. A server for carrying out a gaming program, the server comprising a processor programmed for carrying out the method comprising:

establishing communication with a first local terminal;

establishing communication with a second local terminal;

transmitting signals to the first local terminal for displaying a first type of game selected to be played by a first player at the first local terminal, the first type of game causing multiple gaming devices to be displayed on a first display screen connected to the first local terminal;

transmitting signals to the second local terminal for displaying the first type of game selected to be played by a second player at the second local terminal, the first type of game causing the multiple gaming devices to be displayed on a second display screen connected to the second local terminal;

transmitting signals to the first local terminal to cause the first local terminal to display the multiple gaming devices on the first display screen;

transmitting signals to the second local terminal to cause the second local terminal to display the multiple gaming devices on the second display screen;

automatically assigning by the server the first player and the second player to a common playing environment;

enabling the first player to select at least a first gaming device out of the multiple gaming devices to play;

enabling the second player to select at least a second gaming device out of remaining multiple gaming devices to play;

transmitting signals to the first local terminal for displaying play of at least the first gaming device selected by the first player on the first display screen along with displaying play of at least the second gaming device selected by the second player on the first display screen;

transmitting signals to the second local terminal for displaying play of at least the first gaming device selected by the first player on the second display screen along with displaying play of at least the second gaming device selected by the second player on the second display screen, the display of the play of at least the first gaming device and the display of the play of at least the second gaming device being identical on the first display screen and second display screen such that play of at least the first gaming device and at least the second gaming device appear to be occurring in a common playing environment; and transmitting signals to the first local terminal and the second local terminal for displaying outcomes of the games played on at least the first gaming device and on at least the second gaming device on the first display screen and the second display screen so that the first player and the second player share a common gaming experience, wherein the first gaming device and the second gaming device are displayed as images of slot machines having slot machine screens.

* * * * *